US009817511B1

(12) United States Patent
Brillante et al.

(10) Patent No.: US 9,817,511 B1
(45) Date of Patent: Nov. 14, 2017

(54) REACHING ANY TOUCH SCREEN PORTION WITH ONE HAND

(71) Applicant: INTERNATIONAL BUSINESS MACHINES CORPORATION, Armonk, NY (US)

(72) Inventors: Francesco Brillante, Scafati (IT); Luca Lazzaro, Naples (IT); Alessandro Scotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/268,150

(22) Filed: Sep. 16, 2016

(51) Int. Cl.
 *G06F 3/041* (2006.01)
(52) U.S. Cl.
 CPC .......... *G06F 3/0416* (2013.01); *G06F 3/0412* (2013.01); *G06F 3/0414* (2013.01); *G06F 2203/04105* (2013.01)
(58) Field of Classification Search
 CPC ..... G06F 3/0412; G06F 3/0414; G06F 3/0416
 USPC ............ 345/156–184, 654; 386/241; 348/52; 715/240, 773, 784
 See application file for complete search history.

(56) References Cited

U.S. PATENT DOCUMENTS

| 5,831,614 A * | 11/1998 | Tognazzini | G06F 3/033 |
| | | | 345/156 |
| 2007/0268274 A1* | 11/2007 | Westerman | G06F 3/0235 |
| | | | 345/173 |
| 2008/0165082 A1* | 7/2008 | Manico | G06F 1/1601 |
| | | | 345/1.3 |
| 2008/0235574 A1* | 9/2008 | Telek | G06F 3/1423 |
| | | | 715/240 |
| 2009/0184935 A1* | 7/2009 | Kim | G06F 3/0416 |
| | | | 345/173 |
| 2010/0020026 A1* | 1/2010 | Benko | G06F 3/041 |
| | | | 345/173 |
| 2011/0035263 A1* | 2/2011 | Ramanathan | G06F 3/0485 |
| | | | 705/14.4 |
| 2011/0050575 A1 | 3/2011 | Krahenbuhl et al. | |
| 2011/0090322 A1* | 4/2011 | Lawther | G06F 3/1423 |
| | | | 348/52 |

(Continued)

FOREIGN PATENT DOCUMENTS

| WO | WO2009035212 | 3/2009 |
| WO | WO2010095783 | 8/2010 |

*Primary Examiner* — Prabodh M Dharia
(74) *Attorney, Agent, or Firm* — Tutunjian & Bitetto, P.C.; Scott S. Dobson

(57) ABSTRACT

A mobile computing device and method performed by a mobile computing device are provided. The mobile computing device includes a touch screen display, a touch enabled border surface, and a processor. The processor is configured to generate image data representing a viewport of the device. The processor is configured to add a graphic representation of at least one user interface element to the image data. The processor is configured to determine a press intensity of a touch pressure applied by a user of the device to the touch screen display in a region where the graphic representation of the at least one user interface element is displayed. The processor is configured to determine a position of the hand of the user using the touch enabled border surface. The processor is configured to slide the viewport downwards based on the press intensity and the position of the hand of the user.

20 Claims, 7 Drawing Sheets

(56) References Cited

U.S. PATENT DOCUMENTS

| | | | | |
|---|---|---|---|---|
| 2011/0304557 A1* | 12/2011 | Wilburn | G06F 3/0488 | 345/173 |
| 2012/0046077 A1* | 2/2012 | Kim | H04M 1/72577 | 455/566 |
| 2012/0212421 A1* | 8/2012 | Honji | G06F 3/0414 | 345/173 |
| 2012/0242591 A1* | 9/2012 | Kawalkar | G06F 3/04886 | 345/173 |
| 2012/0262398 A1* | 10/2012 | Kim | G06F 3/041 | 345/173 |
| 2012/0309532 A1 | 12/2012 | Ambrus et al. | | |
| 2013/0089301 A1* | 4/2013 | Ju | H04N 5/91 | 386/241 |
| 2013/0113714 A1 | 5/2013 | Mao | | |
| 2013/0127765 A1* | 5/2013 | Behdasht | G06F 3/041 | 345/173 |
| 2013/0147739 A1* | 6/2013 | berg | G06F 3/0488 | 345/173 |
| 2013/0265246 A1* | 10/2013 | Tae | G06F 3/041 | 345/173 |
| 2013/0298014 A1* | 11/2013 | Kodimer | H04N 1/00411 | 715/251 |
| 2014/0022192 A1* | 1/2014 | Hatanaka | G06F 3/041 | 345/174 |
| 2014/0195957 A1* | 7/2014 | Bang | G06F 3/04812 | 715/773 |
| 2014/0225821 A1* | 8/2014 | Kim | H04M 1/236 | 345/156 |
| 2015/0023650 A1* | 1/2015 | Austin | H04N 21/4314 | 386/241 |
| 2015/0095843 A1* | 4/2015 | Greborio | G06F 3/0481 | 715/784 |
| 2015/0149078 A1* | 5/2015 | Profous | G01C 21/3446 | 701/426 |
| 2015/0149899 A1* | 5/2015 | Bernstein | G06F 3/016 | 715/702 |
| 2015/0169095 A1* | 6/2015 | Nishitani | G06F 3/041 | 345/173 |
| 2015/0186008 A1* | 7/2015 | Hicks | G06F 3/04817 | 715/765 |
| 2015/0205400 A1* | 7/2015 | Hwang | G06F 3/044 | 345/654 |
| 2015/0237187 A1* | 8/2015 | Kim | H04M 1/673 | 455/411 |
| 2015/0259000 A1* | 9/2015 | Takahashi | G06F 3/044 | 701/1 |
| 2015/0293592 A1* | 10/2015 | Cheong | G06F 3/016 | 345/173 |
| 2015/0321351 A1* | 11/2015 | Kapoor | G05B 19/427 | 700/264 |
| 2016/0018943 A1* | 1/2016 | Nara | G06F 3/1454 | 345/173 |
| 2016/0041648 A1* | 2/2016 | Richards | G01L 25/00 | 345/174 |
| 2016/0047102 A1 | 2/2016 | Su | | |
| 2016/0062584 A1* | 3/2016 | Cohen | G06F 3/0485 | 715/784 |
| 2016/0062619 A1 | 3/2016 | Reeve et al. | | |
| 2016/0070466 A1* | 3/2016 | Chaudhri | G06F 3/0484 | 715/765 |
| 2016/0085329 A1* | 3/2016 | Yim | G06F 21/35 | 345/173 |
| 2016/0103542 A1* | 4/2016 | Ogata | G06F 1/1643 | 345/174 |
| 2016/0210004 A1* | 7/2016 | Shinohara | G06F 3/0485 | |
| 2016/0283094 A1* | 9/2016 | Choi | G06F 3/04847 | |
| 2016/0338120 A1* | 11/2016 | Boyle | H04L 65/1069 | |
| 2016/0357305 A1* | 12/2016 | Wells | G06F 3/0416 | |
| 2016/0357368 A1* | 12/2016 | Federighi | G06F 3/0483 | |
| 2016/0357390 A1* | 12/2016 | Federighi | G06F 3/0483 | |
| 2016/0357404 A1* | 12/2016 | Alonso Ruiz | G06F 3/0483 | |
| 2017/0003859 A1* | 1/2017 | Yang | G06F 3/04886 | |

* cited by examiner

REACHING ANY TOUCH SCREEN PORTION WITH ONE HAND

BACKGROUND

Technical Field

The present invention relates generally to information processing and, in particular, to reaching any touch screen portion with one hand.

Description of the Related Art

One of the common use cases for a mobile device user is hold the mobile device with one hand while using a touch screen of the mobile device. According to different screen dimensions and different thumb sizes, touching the entire screen with only one hand can be really difficult. Sometimes users are forced to perform frustrating actions to reach some screen portions (e.g., a button positioned in the top left corner of the screen) using the second hand or, at the least, doing non-ergonomic movements with a single hand. In particular, conditions using two hands are impossible (e.g., when you are upright in a subway car, while you are driving, and so forth), and the problem is amplified for persons who have hand disabilities. Thus, there is a need for a way to quickly reach any touch screen portion with one hand.

SUMMARY

According to an aspect of the present invention, a mobile computing device is provided. The mobile computing device includes a touch screen display, a touch enabled border surface, and a processor. The processor is configured to generate image data representing a viewport of the device. The processor is further configured to add a graphic representation of at least one user interface element to the image data. The processor is also configured to determine a press intensity of a touch pressure applied by a user of the device to the touch screen display in a region where the graphic representation of the at least one user interface element is displayed. The processor is additionally configured to determine a position of the hand of the user using the touch enabled border surface. The processor is further configured to slide the viewport downwards based on the press intensity and the position of the hand of the user.

According to another aspect of the present invention, a method performed by a mobile computing device having at least a touch screen display and a processor is provided. The method includes generating image data representing a viewport of the device. The method further includes adding a graphic representation of at least one user interface element to the image data. The method also includes determining a press intensity of a touch pressure applied by a user of the device to the touch screen display in a region where the graphic representation of the at least one user interface element is displayed. The method additionally includes determining a position of the hand of the user using a touch enabled border surface provided on the device. The method further includes sliding the viewport downwards based on the press intensity and the position of the hand of the user.

According to yet another aspect of the present invention, a computer program product is provided. The computer program product is for making screen regions, of a mobile computing device having at least a touch screen display and a processor, accessible to a user of the device. The computer program product includes a computer readable storage medium having program instructions embodied therewith. The program instructions are executable by a computer to cause the computer to perform a method. The method includes generating image data representing a viewport of the device. The method further includes adding a graphic representation of at least one user interface element to the image data. The method also includes determining a press intensity of a touch pressure applied by the user to the touch screen display in a region where the graphic representation of the at least one user interface element is displayed. The method additionally includes determining a position of the hand of the user using a touch enabled border surface provided on the device. The method further includes sliding the viewport downwards based on the press intensity and the position of the hand of the user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

The present invention sis directed to reaching any touch screen portion with one hand.

In an embodiment, the present invention advantageously enables the sliding, by a user using one hand, of the position of the viewport of a screen of a mobile computing device, thus allowing the user to reach the upper-side screen portions that would otherwise be unreachable with that hand. The term "viewport" refers to an area (typically rectangular) expressed in rendering-device-specific coordinates, e.g. pixels for screen coordinates, in which the objects of interest are rendered. In an embodiment, the present invention provides touch-enabled portions positioned in part of the device that are able to slide the screen until the unreachable portion could be quickly reach.

Figure 1:
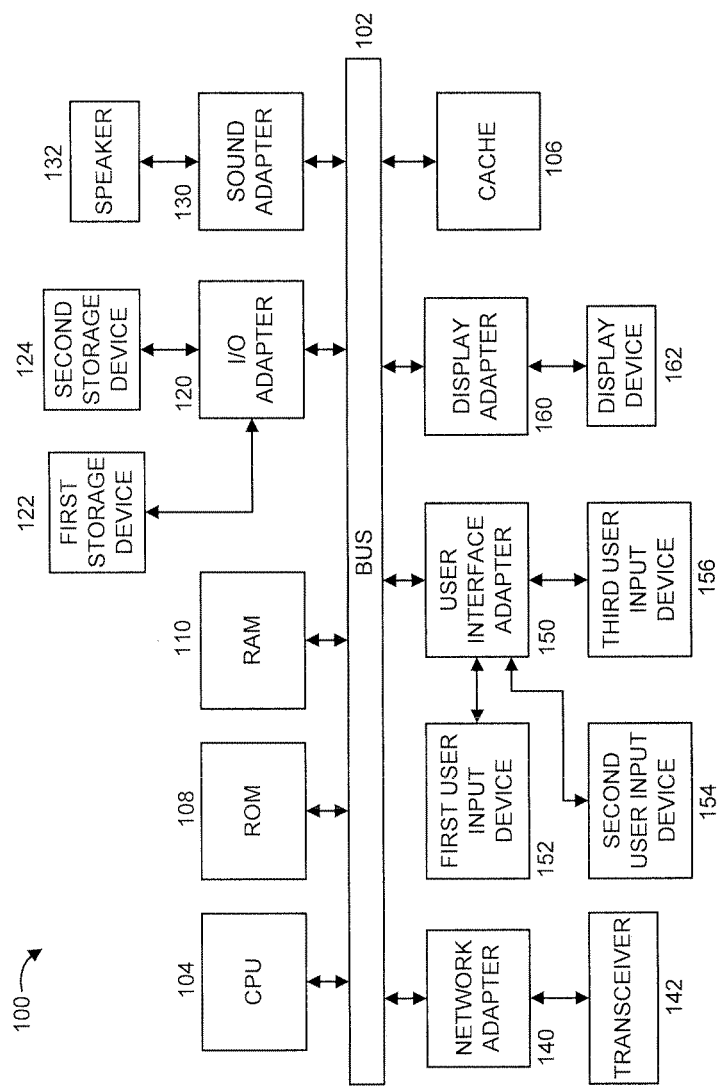
FIG. 1 shows an exemplary processing system 100 to which the present invention may be applied, in accordance with an embodiment of the present invention.

FIG. 1 shows an exemplary mobile computing device 100 to which the present invention may be applied, in accordance with an embodiment of the present invention. The mobile computing device 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the mobile computing device 100 may also include other elements (not shown), as readily contemplated by one of skill in the art, as well as omit certain elements. For example, various other input devices and/or output devices can be included in mobile computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the mobile computing device 100 are readily contemplated by one of ordinary skill in the art given the teachings of the present invention provided herein.

Figure 2:
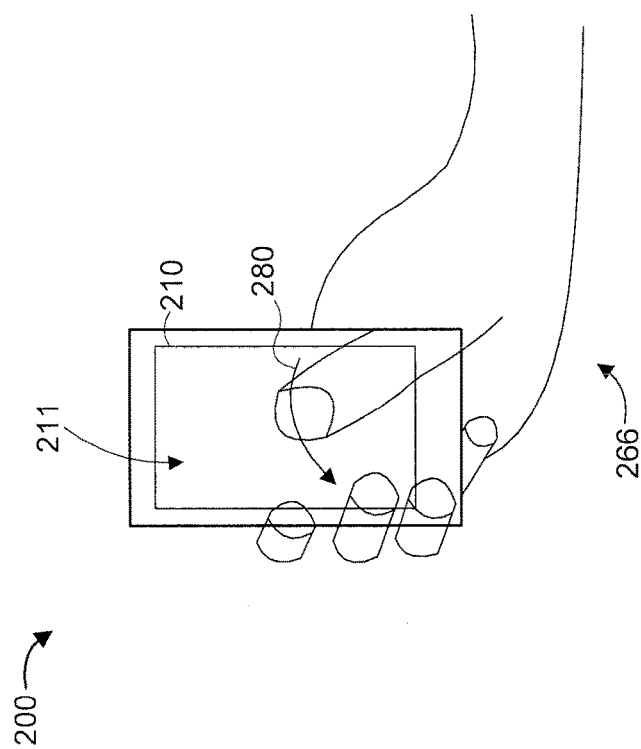
FIG. 2 shows an exemplary mobile computing device 200 to which the present invention can be applied, gripped by a user, in accordance with an embodiment of the present invention.
Figure 3:
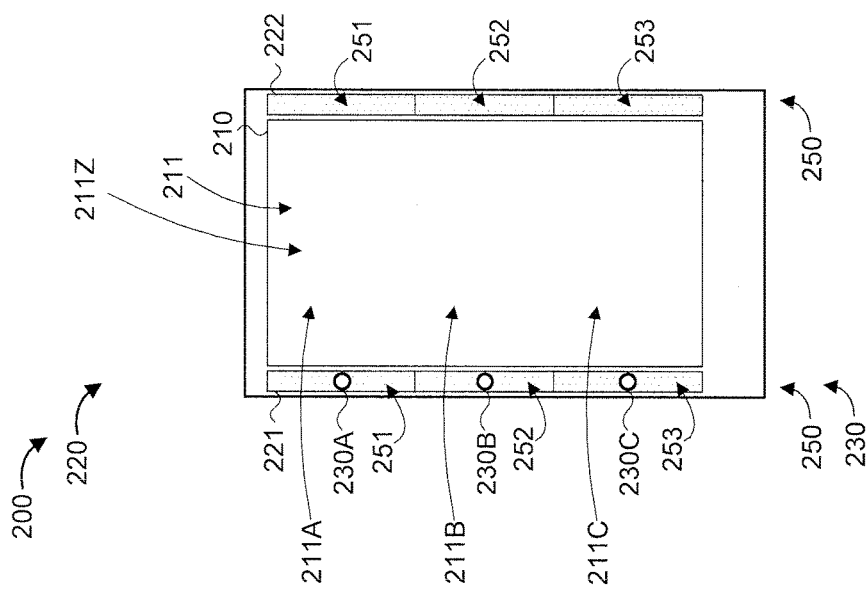
FIG. 3 further shows mobile computing device 200, in accordance with an embodiment of the present invention.
Figure 4:
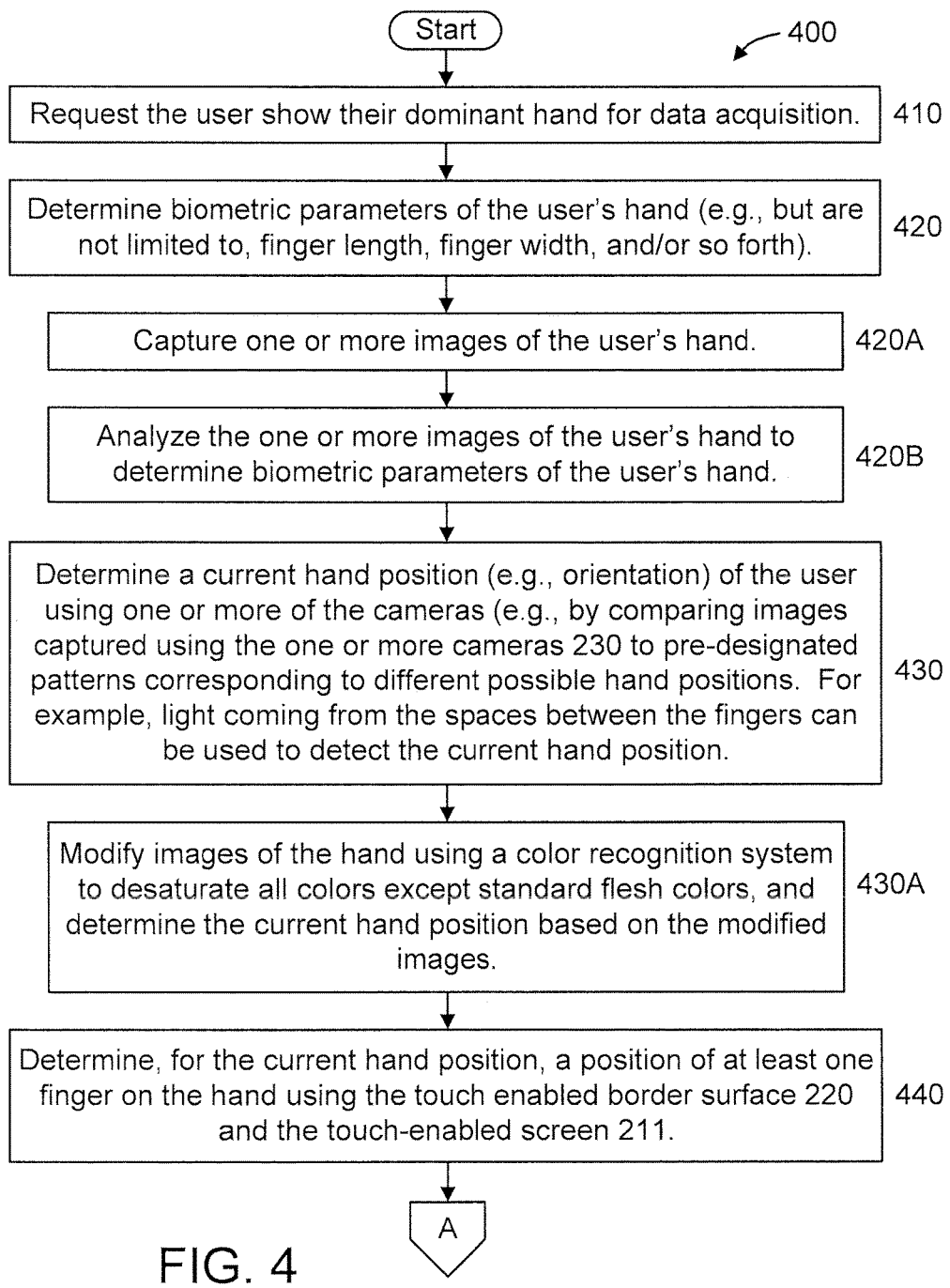
FIGS. 4-7 show an exemplary method 400 for reaching any touch screen portion with one hand, in accordance with an embodiment of the present invention.
Figure 5:
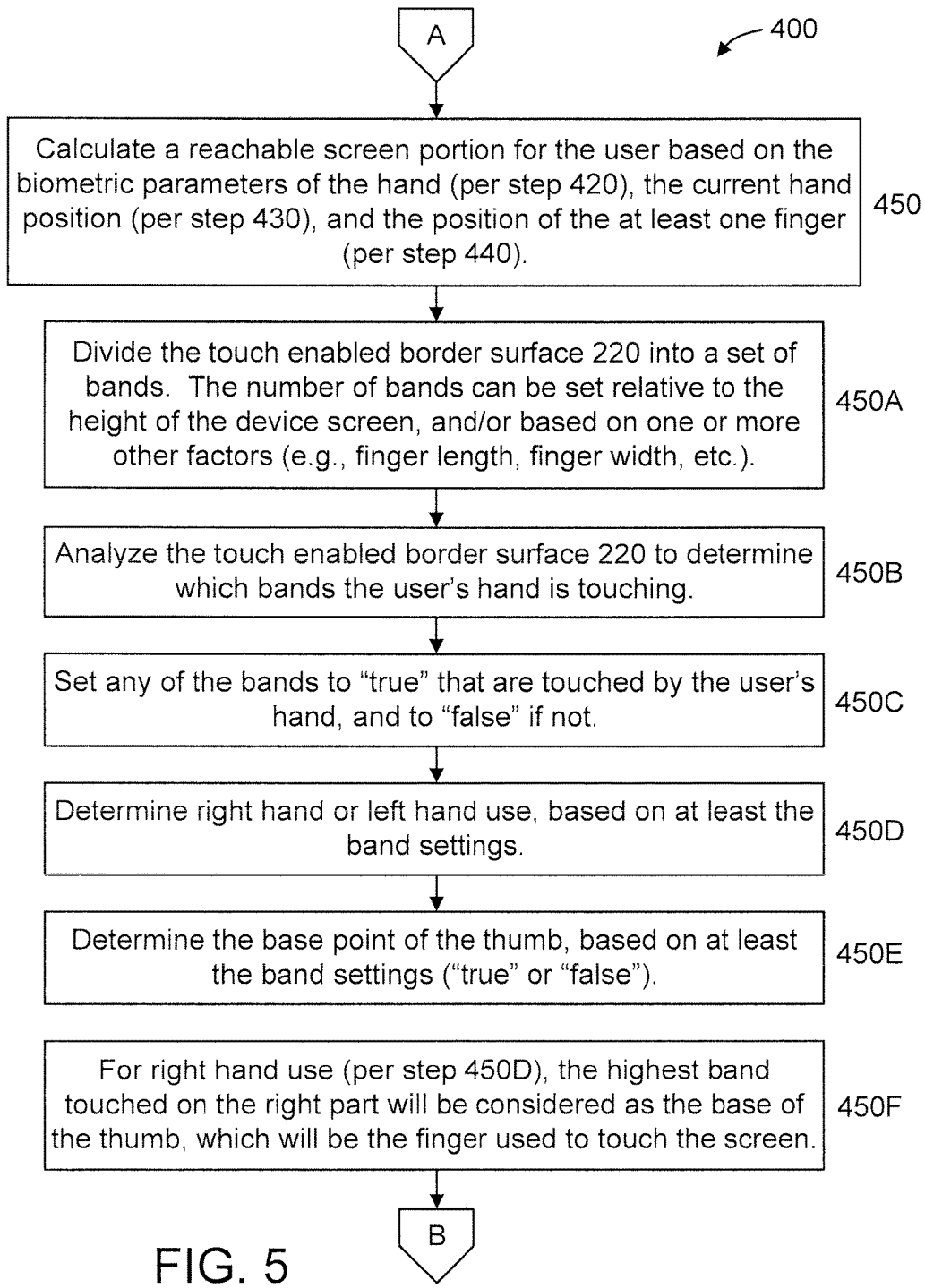
Figure 6:
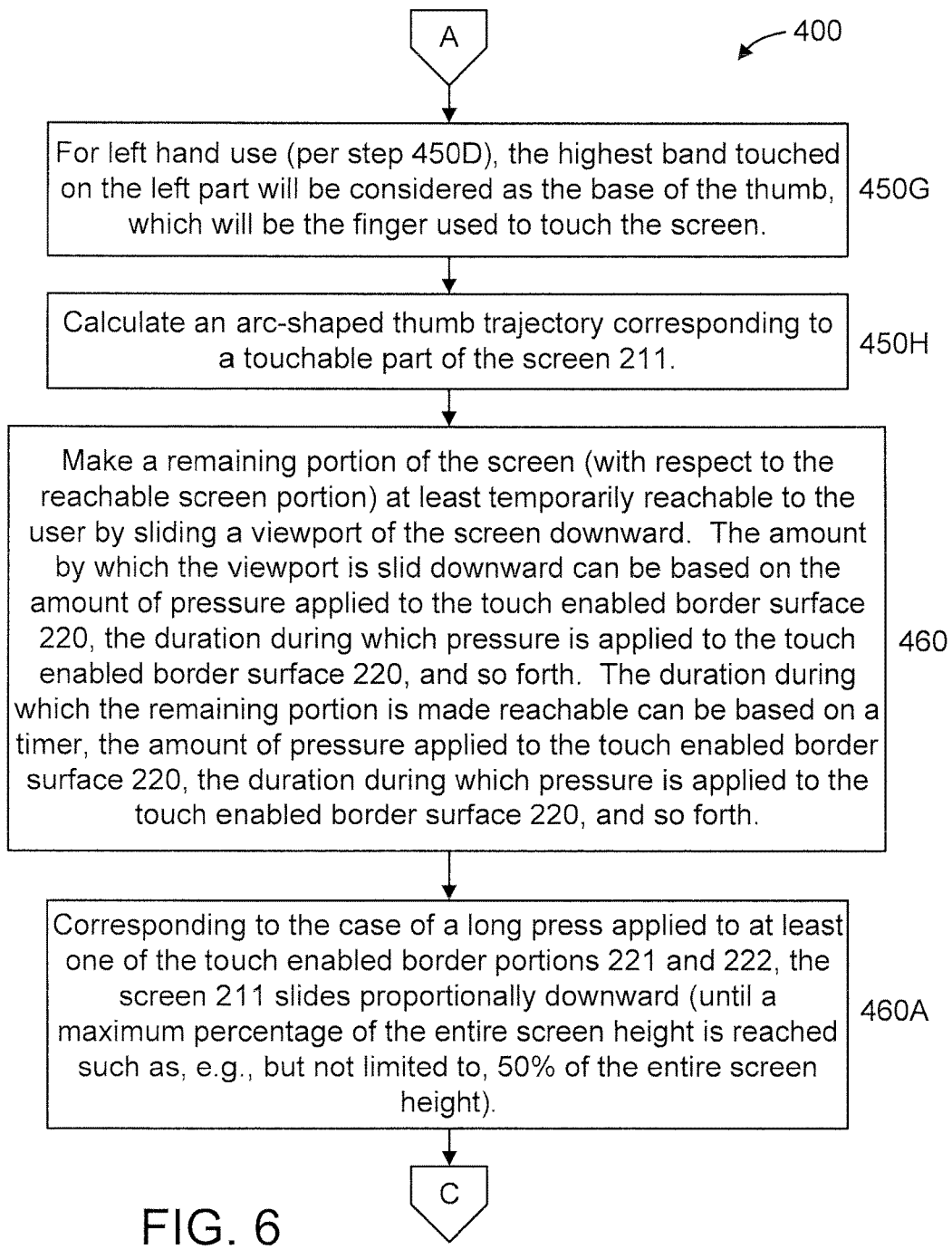
Figure 7:
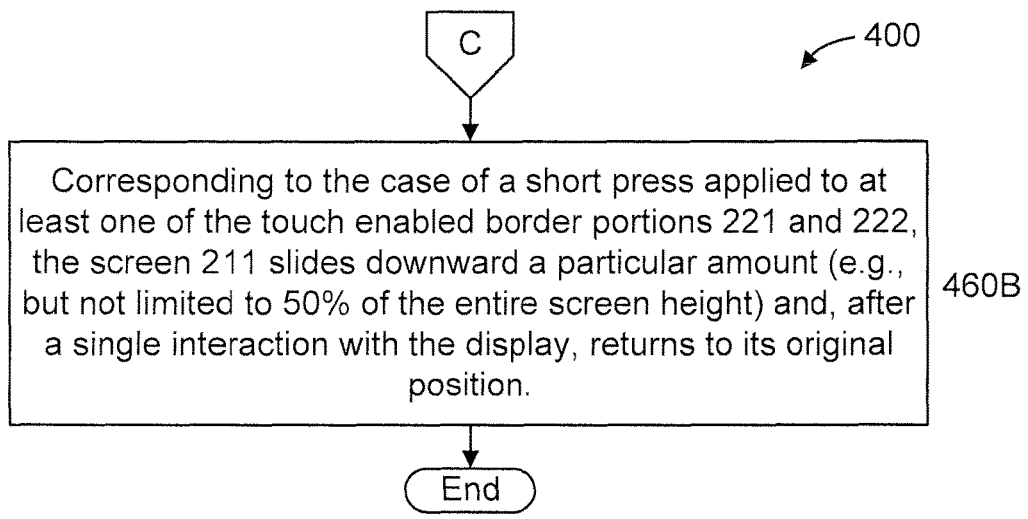

Moreover, it is to be appreciated that mobile computing device 200 described below with respect to FIGS. 2 and 3 is a device for implementing respective embodiments of the present invention. Part or all of mobile computing device 100 may be implemented in one or more of the elements of mobile computing device 200.

Further, it is to be appreciated that mobile computing device 100 may perform at least part of the method described herein including, for example, at least part of method 400 of FIGS. 4-7. Similarly, part or all of mobile computing device 200 may be used to perform at least part of method 400 of FIGS. 4-7.

FIG. 2 shows an exemplary mobile computing device 200 to which the present invention can be applied, gripped by a user, in accordance with an embodiment of the present invention. In the embodiment of FIG. 2, the mobile computing device 200 is a smart phone having a display device 210 with a touch-enabled screen (hereinafter "screen" in short) 211. While a smart phone is shown in the embodiment of FIG. 2, it is to be appreciated that any mobile computing device can be used in accordance with the teachings of the present invention including, but not limited to, a media player, a personal digital assistant, a tablet, and so forth.

In the embodiment of FIG. 2, it is shown how a smart phone is typically gripped with one hand 266. As is plainly evident, due to the grip and other factors (e.g., screen size, finger length, and so forth), the user is unable to easily, if at all, reach all portions of the screen 211. An arc-shaped thumb trajectory 280 shows the likely reach of the user's thumb relative to the screen 211.

Thus, when handled with one hand, the smart-phone screen 211 has the form of a rectangle with a base<<the height, such that the top part of the screen 211 is typically unreachable. Moreover, the longer the screen 211, the harder it is to reach the top-positioned user interface (UI) elements of the screen 211.

FIG. 3 further shows mobile computing device 200, in accordance with an embodiment of the present invention.

The mobile computing device 200 further includes a touch enabled border surface 220, a set of cameras 230, and a screen manager 240.

In the embodiment of FIG. 3, the set of cameras 230 includes a first camera 230A, a second camera 230B, and a third camera 230C. The first camera 230A is located near a top portion 211A of the screen 211, the second camera 230B is located near a middle portion 211B of the screen 211, and the third camera 230C is located near a bottom portion 211C of the screen 211. In the case when the views of any of the cameras 230 are obstructed (e.g., due to the placement of the user's hands), the unobstructed cameras can be used. The top portion 211A, middle portion 211B, and bottom portion 211C of the screen 211 form the viewport 211Z of the screen 211 in which data is rendered. While the embodiment of FIG. 3 shows three cameras, other numbers of cameras can also be used in accordance with the teachings of the present invention, while maintaining the spirit of the present invention. In an embodiment, the cameras are infrared enabled, allowing them to capture images in the infrared spectrum.

In the embodiment of FIG. 3, the touch enabled border surface 220 includes a first touch enabled border portion 221 and a second touch enabled border portion 222. In the embodiment of FIG. 3, the cameras 230 are integrated in the first touch enabled border portion 221. In other embodiments, cameras can also be integrated in the second touch enabled border portion 222, depending upon the implementation. The touch enabled border portions 221 and 222 can be implemented using buttons, and/or so forth. The first touch enabled border portion 221 and the second touch enabled border portion 222 are positioned on respective borders (e.g., left and right borders) of the mobile computing device 200. In an embodiment, each of the touch enabled border portions 221 and 222 can also span part of the bottom border of the mobile computing device 200, or a third touch enabled border portion can be used to span the bottom border, to provide a further degree of touch determination along the bottom border. However, simply having portions along the left and right borders is sufficient for the purposes of the present invention. Each of the touch enabled border portions 221 and 222 is able to recognize "press intensity". As used herein, the phrase "press intensity" refers to (1) an amount of pressure that is applied to a touch enabled border portion(s) and/or (2) a duration during which pressure is applied to a touch enabled border portion(s).

In an embodiment, the first touch enabled border portion 221 and/or the second touch enabled border portion 222 are divided into a set(s) of bands 250. For example, a first band 251 can be adjacent to the top portion 211A of the screen 211, a second band 252 can be adjacent to the middle portion 211B of the screen 211, and a third band 253 can be adjacent to the lower portion 211C of the screen. The number of bands can be set relative to the height of the device screen, and/or based on one or more other factors (e.g., finger length, finger width, etc.). Of course, other segmentations (numbers of bands) can also be used, while maintaining the spirit of the present invention.

In the embodiment of FIG. 3, two portions are provided instead of one portion due to the fact that the present invention can be used by left-handed and right-handed people. In other embodiments, a single portion can be used for cases when the device is to be essentially configured for only one of the preceding (that is, for only left handed users or only for right handed users).

The touch enabled border portions 221 and 222 are configured to respond to two types of interactions, namely: (1) a long press; and (2) a short press. In the preceding two types of interactions, the terms "long" and "short" relate to relative depths at which and/or relative time durations during which, pressure is applied to a point on the touch enabled border portions 221 and 222. The former (depth) is indicative of the amount of pressure applied and the latter (time duration) is indicative of the duration of the applied pressure.

In the case of a long press applied to at least one of the touch enabled border portions 221 and 222, the screen 211 slides proportionally downward (until a maximum percentage of the entire screen height is reached such as, e.g., but not limited to, 50% of the entire screen height). With this kind of action, the user can interact multiple times with the user interface of the screen 211, where the screen 211 thereafter takes its original position when at least one of the touch enabled border portions 221 or 222 is released.

In the case of a short press applied to at least one of the touch enabled border portions 221 and 222, the screen 211 slides downward a particular amount (e.g., but not limited to 50% of the entire screen height) and, after a single interaction with the display, returns to its original position.

Thus, using either a long press or a short press, a user's thumb can also reach the top part of the screen that would likely be otherwise unreachable by the user, as shown by the arc-shaped thumb trajectory 280 in FIG. 2.

In an embodiment, the sliding of the screen 211 is implemented at the operating system level. In other embodiments, other configurations can be used, while maintaining the spirit of the present invention.

The operating system can receive an intensity value (amount of force value) and/or a timeframe value during which at least one of the portions is pressed (duration of force value), and react accordingly to the entire operating system viewport.

FIGS. 4-7 show an exemplary method 400 for reaching any touch screen portion with one hand, in accordance with an embodiment of the present invention. The method 400 is particularly suitable for mobile computing devices that are typically held by a user using only hand. In such a case, the user's thumb is the likely finger that the user will use to reach the screen in order to interface with the screen. One or more of the initial steps of method 400 can be considered to correspond to a learning phrase of method 400.

At step 410, request the user show their dominant hand for data acquisition. It is presumed that the user will use their dominant hand to hold and use the mobile computing device. Of course, if the user uses their other hand for phone use, then their non-dominant hand may be shown in response to the request. Of course, in other embodiments, the system can request the user show both their hands for data acquisition, to allow the user to use the mobile computing device ambidextrously.

At step 420, determine biometric parameters of the user's hand. The biometric parameters can include, but are not limited to, finger length, finger width, and/or so forth.

In an embodiment, step 420 includes step 420A.

At step 420A, capture one or more images of the user's hand. Step 420A can be performed using one or more of the cameras 230.

At step 420B, analyze the one or more images of the user's hand to determine biometric parameters of the user's hand.

At step 430, determine a current hand position (e.g., orientation) of the user using one or more of the cameras 230. The current hand position can be determined by comparing images captured using the one or more cameras 230 to pre-designated patterns corresponding to different possible hand positions. As one example, light coming from the spaces between the fingers can be used to detect the current hand position.

In an embodiment, step 430 includes step 430A.

At step 430A, modify images of the hand using a color recognition system to desaturate all colors except standard flesh colors, and determine the current hand position based on the modified images. The desaturation enables the hand portions to be more pronounced and/or otherwise emphasized in order to be more easily identified in the images.

At step 440, determine, for the current hand position, a position of at least one finger on the hand using the touch enabled border surface 220 and the touch-enabled screen 211. For the sake of illustration, the position of at least the thumb is determined, where the thumb is identified from the other fingers on the user's hand based on the current hand position (orientation).

At step 450, calculate a reachable screen portion for the user based on the biometric parameters of the hand (per step 420), the current hand position (per step 430), and the position of the at least one finger (per step 440). In an embodiment, the information for the current hand position and the position of the at least one finger is correlated to the biometric parameters of the hand. In an embodiment, the respective reachable screen portion for a finger is determined based at least on the size (e.g., length and/or width) of the finger and the position of the finger.

In an embodiment, the determination of finger position (per step 440) can include determining if the finger is being used to hold the device. Thus, in an embodiment, if the finger is being used to hold the device, it is determined that the reachable screen portion for that finger is none. Otherwise, in an embodiment, the reachable screen portion is estimated starting from the position at which the finger is touching the device, in consideration of the biometric parameters of the hand such as the length of that finger. In another embodiment, the thumb can be identified at the onset and used for the steps involving a finger.

In an embodiment, step 450 includes step 450A-450H.

At step 450A, divide the touch enabled border surface 220 into a set of bands. The number of bands can be set relative to the height of the device screen, and/or based on one or more other factors (e.g., finger length, finger width, etc.).

At step 450B, analyze the touch enabled border surface 220 to determine which bands the user's hand is touching.

At step 450C, set any of the bands to "true" that are touched by the user's hand, and to "false" if not.

At step 450D, determine right hand or left hand use, based on at least the band settings.

At step 450E, determine the base point of the thumb, based on at least the band settings ("true" or "false"). For example, if the mobile computing device is being held with the right hand, there will be a set of consecutive "touched" bands on the right (with possibly "untouched" bands on the top and on the bottom on the right (or at least on the top of the screen 211)), and alternate bands on the left that identifies multiple fingers that are touching the mobile computing device. The opposing arrangement would be implicated in the case when the mobile computing device is being held with the left hand.

At step 450F, for right hand use (per step 450D), the highest band touched on the right part will be considered as the base of the thumb, which will be the finger used to touch the screen.

At step 450G, for left hand use (per step 450D), the highest band touched on the left part will be considered as the base of the thumb, which will be the finger used to touch the screen.

At step 450H, calculate an arc-shaped thumb trajectory corresponding to a touchable part of the screen 211.

At step 460, make a remaining portion of the screen (with respect to the reachable screen portion) at least temporarily reachable to the user by sliding a viewport of the screen downward. The amount by which the viewport is slid downward can be based on the amount of pressure applied to the touch enabled border surface 220, the duration during which pressure is applied to the touch enabled border surface 220, and so forth. The duration during which the remaining portion is made reachable can be based on a timer, the amount of pressure applied to the touch enabled border surface 220, the duration during which pressure is applied to the touch enabled border surface 220, and so forth.

In an embodiment, step 460 includes steps 460A-460B.

At step 460A, corresponding to the case of a long press applied to at least one of the touch enabled border portions 221 and 222, the screen 211 slides proportionally downward (until a maximum percentage of the entire screen height is reached such as, e.g., but not limited to, 50% of the entire screen height). With this kind of action, the user can interact multiple times with the user interface of the screen 211, where the screen 211 thereafter takes its original position when at least one of the touch enabled border portions 221 or 222 is released.

At step 460B, corresponding to the case of a short press applied to at least one of the touch enabled border portions 221 and 222, the screen 211 slides downward a particular amount (e.g., but not limited to 50% of the entire screen height) and, after a single interaction with the display, returns to its original position.

It is to be appreciated that steps 460A and 460B represent 2 from among a myriad of possible configurations for the viewport depending on the type of press.

A description will now be given of some of the many attendant advantages of the present invention.

One advantage is reduced frustration derived from impossibility of performing basic actions and user experience improvement.

Another advantage is improved ergonomics for a mobile device without impacting its original device design, user interface design, and so forth.

Yet another advantage is reduced user errors derived by "tapping" on unwanted screen zones.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A mobile computing device, comprising:
a touch screen display;
a touch enabled border surface; and
a processor configured to:
use a viewport to display data on a user interface of the touch screen display, the data including a graphic representation of at least one user interface element;
determine a press intensity applied by a thumb of a user on the touch enabled border surface, the press intensity relating to at least a time duration of contact of the thumb of the user on the touch enabled border surface; and
adjust, based on the press intensity applied by the thumb of the user, a position of the viewport such that the viewport moves from its original position toward a region in proximity to a hand of the user to enable the user to access an unreachable portion of the same user interface displaying the graphic representation of at least one user interface element via the thumb, and moves back to its original position upon release of the thumb of the user.

2. The mobile computing device of claim 1, wherein the viewport is adjusted by an amount that is proportional to the press intensity applied by the thumb of the user.

3. The mobile computing device of claim 1, wherein the press intensity is a long press resulting in adjusting the position of the viewport by a distance defined by a size of the touch screen display.

4. The mobile computing device of claim 3, wherein after the user accesses the graphic representation of at least one user interface element via the thumb, the touch screen display automatically resets to its original position.

5. The mobile computing device of claim 1, wherein the press intensity is a short press resulting in adjusting the position of the viewport by a distance defined by a size of the touch screen display.

6. The mobile computing device of claim 1, further comprising one or more cameras for capturing one or more images of the hand of the user, wherein the processor is further configured to determine biometrics of the hand of the user and a position of the hand of the user based on the one or more images.

7. The mobile computing device of claim 6, wherein the position of the hand of the user is determined based on light passing through spaces between fingers of the hand of the user.

8. The mobile computing device of claim 6, wherein the processor is further configured to modify the one or more images of the hand of the user using a color recognition system to desaturate all colors except flesh colors, and determine the positions of the hand of the user using the modified images.

9. The mobile computing device of claim 1, wherein the processor is further configured to determine a position of at least one finger on the hand of the user using the touch screen display and the touch enabled border surface.

10. The mobile computing device of claim 9, wherein the processor is further configured to calculate a reachable screen portion for the user based on a position of the hand acid the position of the at least one finger on the hand.

11. The mobile computing device of claim 9, wherein the processor is configured to calculate the reachable screen portion for the user further based on biometric parameters of the hand of the user.

12. The mobile computing device of claim 9, further comprising determining the position of at least one other finger on the hand of the user using the touch screen display and the touch enabled border surface, when the at least one finger is determined to be positioned holding the device.

13. The mobile computing device of claim 1, wherein the touch enabled border surface is divided into a set of bands, and wherein a position of the hand of the user is determined based on which of the bands are in contact with the hand of the user.

14. The mobile computing device of claim 13, wherein the processor is further configured to calculate an arc-shaped thumb trajectory corresponding to a touchable part of the touch screen display, and make a remaining portion of the touch screen display, with respect to a reachable screen portion, at least temporarily reachable to the user by adjusting the viewport in a first direction.

15. The mobile computing device of claim 14, wherein the processor is further configured to determine a base point of the thumb on the hand of the user using the touch enabled border surface, and wherein the arc-shaped thumb trajectory is calculated using the base point of the thumb as a starting point.

16. A method performed by a mobile computing device having at least a touch screen display and a processor, the method comprising:
  using a viewport to display data on a user interface of the touch screen display, the data including a graphic representation of at least one user interface element;
  determining a press intensity applied by a thumb of a user on the ouch enabled border surface, the press intensity relating to at least a time duration of contact of the thumb of the user on the touch enabled border surface; and
  adjusting, based on the press intensity applied by the thumb of the user, a position of the viewport such that the viewport moves from its original position toward a region in proximity to a hand of the user to enable the user to access an unreachable portion of the same user interface displaying the graphic representation of at least one user interface element via the thumb, and moves back to its original position upon release of the thumb of the user.

17. The method of claim 16, wherein the touch enabled border surface is divided into a set of bands, and wherein a position of the hand of the user is determined based on which of the bands are in contact with the hand of the user.

18. The method of claim 17, further comprising:
  calculating an arc-shaped thumb trajectory corresponding to a touchable part of the touch screen display; and
  making a remaining portion of the touch screen display, with respect to a reachable screen portion, at least temporarily reachable to the user by adjusting the viewport in a first direction.

19. The method of claim 18, wherein the processor is farther configured to determine a base point of the thumb on the hand of the user using the touch enabled border surface, and wherein the arc-shaped thumb trajectory is calculated using the base point of the thumb as a starting point.

20. A computer program product for making screen regions, of a mobile computing device having at least a touch screen display and a processor, accessible to a user of the device, the computer program product comprising a computer readable storage medium having program instructions embodied therewith, the program instructions executable by a computer to cause the computer to perform a method comprising:
  using a viewport to display data a user interface of on the touch screen display, the data including a graphic representation of at least one user interface element;
  determining a press intensity applied by a thumb of a user on the touch enabled border surface, the press intensity relating to at least a time duration of contact of the thumb of the user on the touch enabled border surface; and
  adjusting, based on the press intensity applied by the thumb of the user, a position of the viewport such that the viewport moves from its original position toward a region in proximity to a hand of the user to enable the user to access an unreachable portion of the same user interface displaying the graphic representation of at least one user interface element via the thumb, and moves back to its original position upon release of the thumb of the user.

* * * * *